Figure 1:
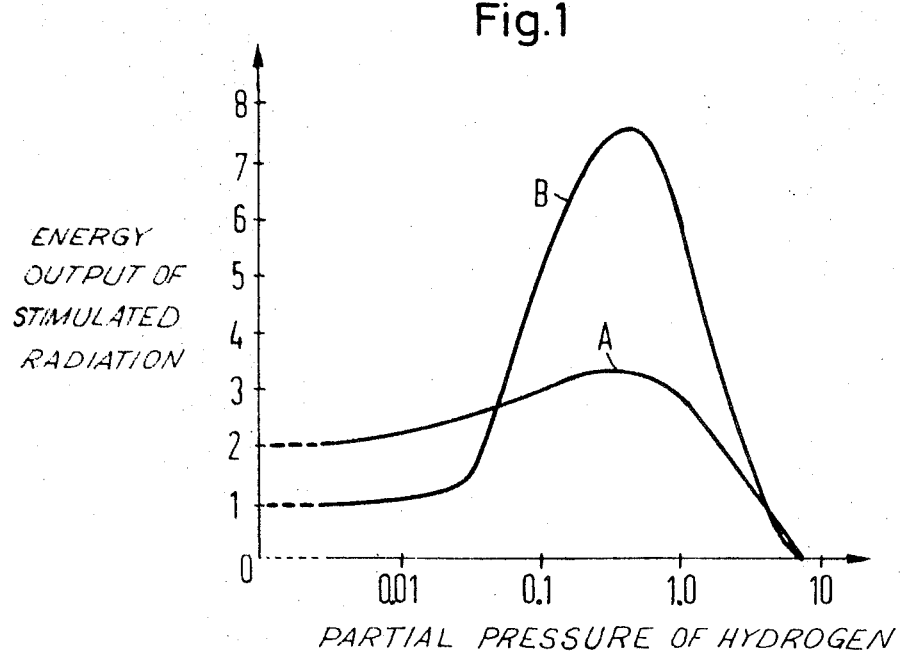

United States Patent

[11] 3,586,994

| [72] | Inventor | Dieter Rosenberger |
| | | Munich, Germany |
| [21] | Appl. No. | 639,235 |
| [22] | Filed | May 17, 1967 |
| [45] | Patented | June 22, 1971 |
| [73] | Assignee | Siemens Aktiengesellschaft |
| | | Berlin and Munich, Germany |
| [32] | Priority | May 18, 1966 |
| [33] | | Germany |
| [31] | | 103872 |

[54] LASER DEVICE WITH GASEOUS MEDIUM FOR INCREASED ENERGY OUTPUT
11 Claims, 2 Drawing Figs.

[52] U.S. Cl. ............................................ 331/94.5, 331/94.5
[51] Int. Cl. ............................................ H01s 3/22
[50] Field of Search ............................................ 331/94.5; 330/4.3

[56] References Cited
UNITED STATES PATENTS
3,412,345  11/1968  Friedl et al. .................... 331/94.5

OTHER REFERENCES

Patel, C. K. N. " CW High Power Nitrogen-Carbon Dioxide Laser." APPLIED PHYSICS LETTERS. Vol. 7, No. 1. July 1, 1965. pp. 15— 17.

Gebbie, H. A. et al. " Interferometric Observations on Far Infra-Red Stimulated Emission Sources." NATURE April 11, 1964. pp. 169' 170.

Witteman, W. J. " Increasing Continuous Laser-Action on Carbon Dioxide Rotational Vibrational Transitions Through Selective Depopulation Of The Lower Laser Levels By Means Of Water Vapour." PHYSICS LETTERS. August 15, 1965. Vol. 18 No. 2. pp. 125— 127

Primary Examiner—Ronald L. Wibert
Assistant Examiner—T. Major
Attorneys—Curt M. Avery, Arthur E. Wilfond, Herbert L. Lerner and Daniel J. Tick ABSTRACT: The gaseous medium for a laser device for radiation amplification comprises carbon dioxide at a partial pressure of about 1.0 Torr, nitrogen at a partial pressure of about 4.0 Torr and hydrogen at a partial pressure of about 0.1 to 1.0 Torr.

LASER DEVICE WITH GASEOUS MEDIUM FOR INCREASED ENERGY OUTPUT

DESCRIPTION OF THE INVENTION

The present invention relates to a laser device for radiation amplification. More particularly, the invention relates to a gaseous medium for a laser device. The laser device comprises a vessel for radiation amplified by such laser device and the gaseous medium flows through such vessel.

Known laser devices utilize a laser-active gaseous medium comprising carbon dioxide or CO for radiation amplification in accordance with the principle of stimulated emission. Nitrogen or $N_2$ and/or helium may be utilized with the carbon dioxide as a laser-active medium. The addition of nitrogen to the gaseous medium may improve the energy output relative to a gaseous medium comprising only carbon dioxide.

The principal object of the present invention is to provide a new and improved laser device, and more specifically, to provide a new and improved gaseous medium for a laser device. The gaseous medium of the present invention provides considerable increased energy output over known laser devices utilizing carbon dioxide and nitrogen gaseous media. The laser device of the present invention ie efficient, effective and reliable in operation and provides a considerable increase in energy output over known laser devices of similar type.

In accordance with the present invention, a gaseous medium for a laser device for radiation amplification comprises carbon dioxide at a partial pressure of about 1.0 Torr, nitrogen at a partial pressure of about 4.0 Torr and hydrogen at a partial pressure of about 0.1 to 1.0 Torr. The gaseous medium is in a vessel of the laser device for radiation amplification by the laser device. Electrodes in the vessel provide an electrical discharge in the vessel. The vessel is substantially tubular and has a diameter of about 20 to 30 mm. Flow conduits opening into the vessel provide a flow of the gaseous medium through the vessel at the velocity of about 5 meters per second.

Figure 2:
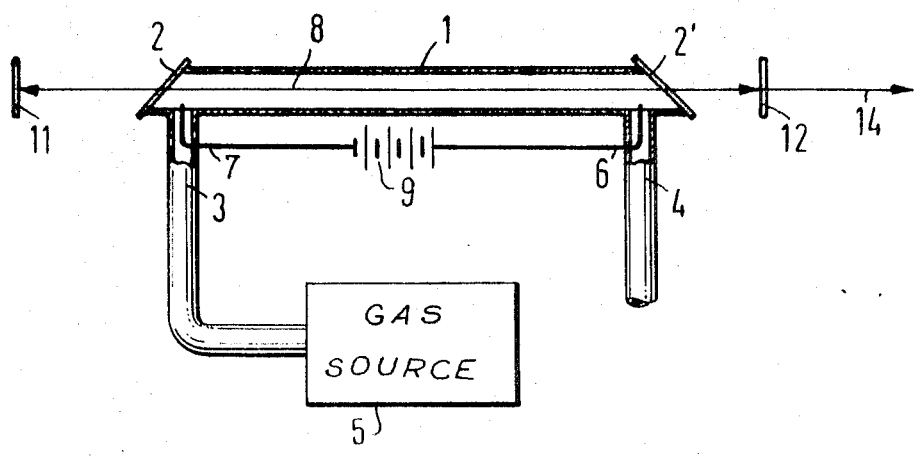

In order that the present invention may be readily carried into effect, it will now be described with reference to the accompanying drawing, wherein:

FIG. 1 is a graphical presentation of the energy output of the laser device relative to the hydrogen in the gaseous medium; and FIG. 2 is a schematic diagram, partly in section, of an embodiment of the laser device of the present invention, such laser device utilizing the gaseous medium of the present invention.

In accordance with the present invention, hydrogen is added as an additional ingredient to a laser-active gaseous medium comprising carbon dioxide and nitrogen. The carbon dioxide of the gaseous medium has a partial pressure of about 1.0 Torr. The nitrogen has a partial pressure of about 4.0 Torr. The hydrogen or $H_2$ has a partial pressure of about 0.1 to 1.0 Torr. The gaseous medium is made to flow through the discharge vessel of a laser device for radiation amplification at a flow velocity of about 5 meters per second.

The energy output of a gaseous laser may be improved, enhanced or increased by the addition of one or more gas components. Thus, in a carbon dioxide laser, for example, nitrogen or air and/or helium may be added in order to improve or increase the energy output. If hydrogen is added to carbon dioxide, there is no appreciable increase in the energy output. When both nitrogen and hydrogen are added to carbon dioxide, however, the energy output of the laser device is increased.

The increased energy output of the laser device of the present invention, utilizing a gaseous medium comprising carbon dioxide, nitrogen and hydrogen, is illustrated in FIG. 1. In FIG. 1, the abscissa indicates the partial pressure of hydrogen in Torr and the ordinate indicates the energy output of stimulated radiation of the laser device.

In FIG. 1, curve A indicates energy output for a gaseous mixture comprising carbon dioxide at a partial pressure of 1.0 Torr and nitrogen at a partial pressure of 2.0 Torr. Curve B indicates the energy output for a gaseous mixture of carbon dioxide at a partial pressure of 1.0 Torr and nitrogen at a partial pressure of 4.0 Torr. As clearly illustrated in FIG. 1, the addition of hydrogen especially at a partial pressure of between 0.1 and 1.0 Torr to the gaseous medium of carbon dioxide and nitrogen results in a considerable increase in the energy output. This is particularly emphasized by the peaked portions of the curves A and B relative to the substantially linear portions of such curves for gaseous media in which there is less than 0.01 Torr partial pressure of hydrogen included.

During the operation of the laser device of the present invention, including the gaseous medium of the present invention comprising carbon dioxide, nitrogen and hydrogen, as aforedescribed, water vapor may be produced during discharge as a result of the action of the hydrogen and the carbon dioxide. Such a reaction is an expected one. When water vapor, instead of hydrogen, is added to a carbon dioxide and nitrogen gaseous medium, the increase in energy output of stimulated radiation is nowhere near the increase of energy output provided by the addition of hydrogen to the carbon dioxide and nitrogen gaseous medium.

The laser device of the present invention is shown in FIG. 2 and comprises known components. In accordance with the present invention, the gaseous medium of carbon dioxide, nitrogen and hydrogen is utilized in the laser device of FIG. 2. The gaseous medium is provided in a tubular vessel 1 for radiation amplified by the laser device. The preferred diameter of the vessel 1 in case of the above given partial pressures of the components of the gaseous medium is between 20 and 30 mm. The partial pressures of the components of the gaseous medium are varied as the diameter of the vessel 1 is varied. More particularly, the variation of partial pressure versus vessel diameter is approximately inversely proportional. Thus, when the diameter of the vessel 1 is reduced to a diameter of approximately 10 mm., maximum possible energy output begins to decrease with further reduction of diameter due to the magnitude of the wavelength of the radiation of the carbon . . . . . . . dioxide, which wavelength is approximately 10 microns.

The tubular vessel 1 is close at both of its ends by radiation-permeable plates 2 and 2'. Each of the radiation-permeable or transparent plates 2 and 2' is inclined at the Brewster angle with the axis of the vessel 1. Conduits 3 and 4 open into the vessel 1 and function as inlet and outlet conduits to provide a flow of gas through said vessel. Thus, the gaseous medium is made to flow through the vessel 1 via the conduits 3 and 4. The flow velocity of the gaseous medium through the vessel 1 is about 5 meters per second.

The gaseous medium need not flow through the vessel 1, but may be stationary in said vessel. In such a case, the partial pressure of the hydrogen would be different from that when the gaseous medium flows through the vessel. In order to maintain the clarity of illustration, further apparatus for providing the gaseous medium is not shown in FIG. 2, except for a gas source 5.

A pair of electrodes 6 and 7 are provided in the vessel 1 for producing an electrical discharge in said vessel. The electrodes 6 and 7 are positioned outside the radiation path 8 in the discharge vessel 1 and are energized by any suitable electrical discharge producing circuit including a power source such as, for example, a battery 9. The electrodes 6 and 7 are preferably positioned in the conduits 3 and 4 with their ends extending into the discharge vessel 1. A complete circuit for providing the discharge voltage to the electrodes 6 and 7 is not shown in FIG. 2 in order to preserve the clarity of the illustration. Furthermore, as hereinbefore mentioned, the components of the laser device of FIG. 2 are known.

Radiation along the radiation path 8 is developed by reflectors 11 and 12 positioned in said radiation path outside the vessel 1 and spaced from the plates 2 and 2'. The radiation passes through the vessel and is amplified in said vessel by stimulated emission in the known manner of laser devices. A decoupling aperture may be provided in one of the reflectors such as, for example, the reflector 12, to permit the derivation from the vessel of a portion 14 of the radiation amplified in the laser device. The diameter of the decoupling aperture is small in relation to the diameter of the vessel 1 and may be from 1 to 2 mm, in magnitude.

I claim:

1. In a laser device for radiation amplification, a gaseous medium consisting essentially of carbon dioxide at a partial pressure of about 1.0 Torr, nitrogen at a partial pressure of about 4.0 Torr and hydrogen at a partial pressure of about 0.1 to 1.0 Torr.

2. A laser device as claimed in claim 1, further comprising a vessel for radiation amplified by said laser device, and wherein said gaseous medium is in said vessel.

3. A laser device as claimed in claim 1, further comprising a vessel for radiation amplified by said laser device and electrode means in said vessel for providing a discharge in said vessel, and wherein said gaseous medium is in said vessel.

4. A laser device as claimed in claim 1, further comprising a substantially tubular vessel for radiation amplified by said laser device, and wherein said gaseous medium is in said vessel.

5. A laser device as claimed in claim 1, further comprising a substantially tubular vessel for radiation amplified by said laser device, said vessel having a diameter of about 20 to 30 mm., and wherein said gaseous medium is in said vessel.

6. A laser device for radiation amplification including
   a gaseous medium consisting essentially of carbon dioxide at a partial pressure of about 1.0 Torr, nitrogen at a partial pressure of about 4.0 Torr and hydrogen at a partial pressure of about 0.1 to 1.0 Torr;
   a vessel for radiation amplified by said laser device; and
   flow means opening into said vessel for providing a flow of gas through said vessel, said flow means providing a flow of said gaseous medium through said vessel.

7. A laser device as claimed in claim 6, wherein said vessel is tubular, and further comprising electrode means in said vessel for providing an electrical discharge in said vessel.

8. A laser device as claimed in claim 6, wherein said vessel is substantially tubular and wherein said gaseous medium flows through said vessel at a velocity of about 5 meters per second.

9. A laser device as claimed in claim 7, wherein said flow means provides a flow of said gaseous medium through said vessel at a velocity of about 5 meters per second.

10. A laser device as claimed in claim 7 wherein said vessel has a diameter of about 20 to 30 mm.

11. A laser device as claimed in claim 5, further comprising electrode means in said vessel for providing a discharge in said vessel.